United States Patent [19]
Mouri et al.

[11] 3,786,179
[45] Jan. 15, 1974

[54] COLOR SUBCARRIER PHASE SHIFT CIRCUIT FOR COLOR TELEVISION RECEIVER

[75] Inventors: Katsuo Mouri, Yokohama; Gentaro Miyazaki, Fujisawa, both of Japan

[73] Assignee: Hitachi, Ltd., Tokyo, Japan

[22] Filed: June 29, 1971

[21] Appl. No.: 157,885

[30] Foreign Application Priority Data

June 29, 1970 Japan .............................. 45/56747

[52] U.S. Cl. .......................................... 178/5.4 SD
[51] Int. Cl. .......................................... H04n 9/50
[58] Field of Search .................... 178/5.4 R, 5.4 SD, 178/5.4 MA, 5.4 SY, 5.4 HE; 329/50

[56] References Cited

UNITED STATES PATENTS

| | | | |
|---|---|---|---|
| 3,435,132 | 3/1969 | Palladino | 178/5.4 SY |
| 3,555,176 | 1/1971 | Cecchin | 178/5.4 SD |
| 3,624,275 | 11/1971 | Lunn | 178/5.4 MA |
| 3,536,825 | 10/1970 | Weher et al. | 178/5.4 SD |
| 3,340,355 | 9/1967 | Richman | 178/5.4 MA |
| 3,405,230 | 10/1968 | Parker | 178/5 D |

*Primary Examiner*—Benedict V. Safourek
*Assistant Examiner*—George G. Stellar
*Attorney*—Craig, Antonelli & Hill

[57] ABSTRACT

A B-Y color subcarrier $\dot{a}_0$ and a signal $\dot{b}_0$, the phase of which is shifted by a specific angle $\theta$ by a phase shift circuit, are supplied to first and second differential amplifiers, thereby to obtain signals $\dot{a}_1$ and $\dot{b}_1$ whose phases are reversed with respect to those of said input signals $\dot{a}_0$ and $\dot{b}_0$ and the signals $\dot{b}_0$ and $\dot{a}_1$ are combined vector-wise by third and fourth differential amplifiers. The signal $\dot{b}_1$ and one of said signals $\dot{a}_0$ and $\dot{a}_1$ are then combined vector-wise by fifth and sixth differential amplifiers at the same time, so that an R-Y subcarrier signal and a G-Y subcarrier signal having specific phase angles 90° and −123° with respect to the color subcarrier signal $\dot{a}_0$ are formed.

16 Claims, 3 Drawing Figures

PATENTED JAN 15 1974 3,786,179

INVENTORS

KATSUO MOURI and GENTARO MIYAZAKI

BY

Craig, Antonelli & Hill

ATTORNEYS

COLOR SUBCARRIER PHASE SHIFT CIRCUIT FOR COLOR TELEVISION RECEIVER

FIELD OF THE INVENTION

This invention relates to color subcarrier phase shift circuits for color television receiver realizable in the form of integrated circuits.

DESCRIPTION OF THE PRIOR ART

In a color television receiver of an NTSC system, three color subcarriers, having specific phase relations with each other, are used for color demodulation. These color subcarriers are:

1. a subcarrier for demodulation of the color difference signal "B-Y" (hereinafter referred to as the B-Y subcarrier ) having a reverse phase relation with respect to the color burst signal,
2. a subcarrier for demodulation of the color difference signal "R-Y" (hereinafter referred to as the R-Y subcarrier ) having a leading phase angle of about 90° , and
3. a subcarrier for demodulation of the color difference signal "G-Y" (hereinafter referred to as the G-Y subcarrier ) having a lagging phase angle of about 123°

In the prior art, the color demodulator is operated in such a manner that the color subcarriers supplied from the color subcarrier generator are applied to the phase shift circuit comprising L, C and R elements whereby the B-Y, R-Y and G-Y subcarriers are formed. This type of color demodulator has drawbacks ; typically, the phase shift circuit cannot be composed of integrated circuits.

SUMMARY OF THE INVENTION

In view of the foregoing, an object of this invention is to provide a color subcarrier phase shift circuit which can be constructed in the form of an integrated circuit.

Another object of this invention is to provide a color subcarrier phase shift circuit constructable into a small size and operable at a high reliability.

Another object of this invention is to provide a color subcarrier phase shift circuit wich can be composed of monolithic integrated circuits and manufactured at a low cost.

Briefly, the above objects are accomplished in accordance with the aspects of this invention by an arrangement in which two signals have mutually different phases are combined vector-wise, whereby a signal with a desired phase is formed.

DESCRIPTION OF THE PREFERRED EMBODIMENT

Figures 1, 2:
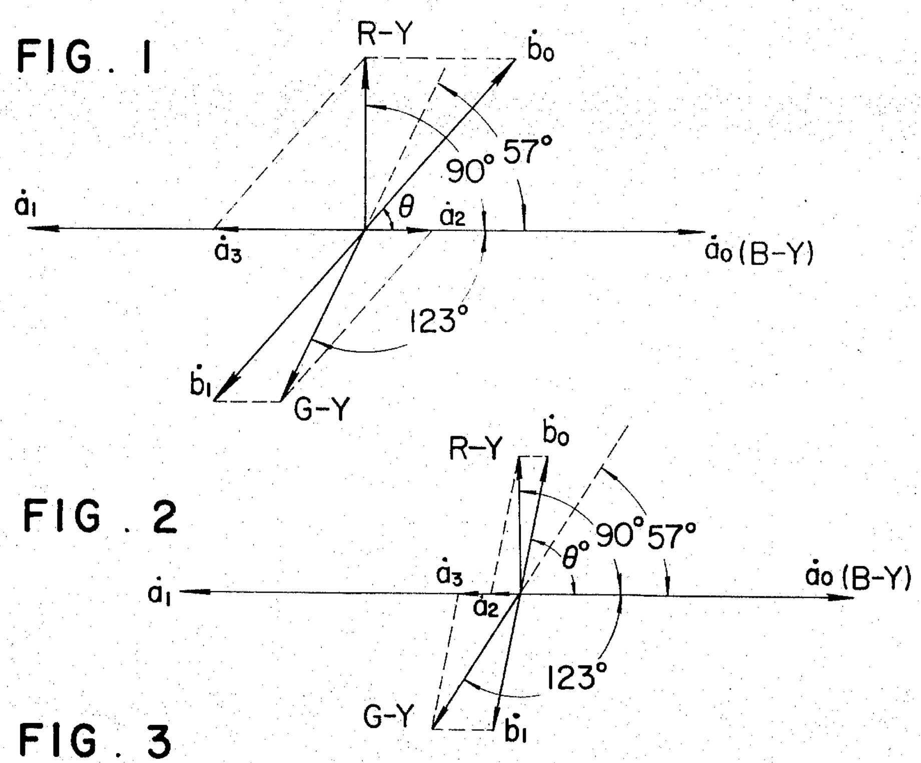
FIGS. 1 and 2 are vector diagrams illustrating the principles of this invention.

Referring to FIGS. 1 and 2, there are shown vectors of subcarriers for illustrating the principles of this invention. In accordance with one aspect of this invention, a signal $\dot{a}_0$ is applied to a $\theta°$ phase lead circuit ( PLC ) whereby a signal $\dot{b}_o$ with a leading phase angle of $\theta$ is formed. Then signals $\dot{a}_1$ and $\dot{b}_1$ having reverse phases with respect to the signals $\dot{a}_o$ and $\dot{b}_o$ are formed in a known manner, such as by utilizing the emitter and collector outputs of a transistor circuit. Said signals $\dot{b}_o$ and $\dot{a}_1$ are combined vector-wise, as are the signal $\dot{b}_1$ and one of said signals $\dot{a}_o$ and $\dot{a}_1$ whereby the desired B-Y, R-Y and G-Y subcarriers are formed. For example, FIG. 1 shows the case where the phase lead angle $\theta$ is less than or equal to 57° and the signal $\dot{a}_0$ is set as the B-Y subcarrier. Then the R-Y subcarrier is formed by combining the vectors of signals $\dot{a}_3$ and $\dot{b}_o$ , and the G-Y subcarrier by combining the vectors of signals $\dot{a}_2$ and $\dot{b}_1$ . FIG. 2 shows the case that the phase lead angle $\theta$ is 57° to 90° in which the signal $\dot{a}_o$ is set at the B-Y subcarrier, and the R-Y subcarrier is formed by combining the vectors of signals $\dot{a}_2$ and $\dot{b}_o$, and the G-Y subcarrier by the vectors of signals $\dot{a}_3$ and $\dot{b}_1$.

In the above examples, the phase of the subcarrier $\dot{a}_o$ is coincident with that of the B-Y subcarrier. Instead, it is apparent that the phase of the subcarrier $\dot{a}_o$ may be coincident with that of the R-Y subcarrier or the G-Y subcarrier, or other desired phase relations may be employed.

Figure 3:
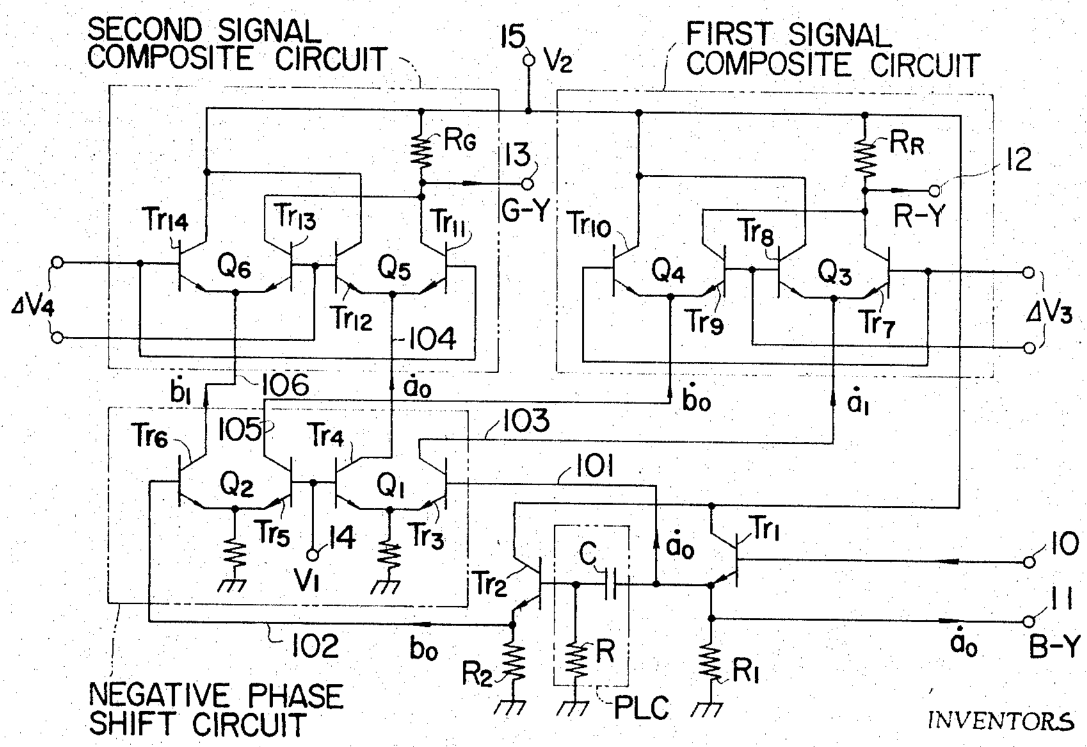
FIG. 3 is a circuit diagram showing an embodiment of this invention.

Referring to FIG. 3, there is shown an embodiment of this invention according to the technique illustrated in FIG. 1. This circuit comprises:

1. two emitter followers one of which consists of a transistor $TR_1$ and a load resistor $R_1$ and the other of which consists of a transistor $Tr_2$ and a load resistor $R_2$ ;
2. a phase lead circuit (PLC) consisting of a capacitor C and a resistor R;
3. differential amplifiers $Q_1$ and $Q_2$ comprising transistors $Tr_3$ and $Tr_4$ , and transistors $Tr_5$ and $Tr_6$ respectively; and
4. differential amplifiers $Q_3$ , $Q_4$ , $Q_5$ and $Q_6$ comprising transistors $Tr_7$ and $Tr_8$ , $Tr_9$ and $Tr_{10}$, $Tr_{11}$ and $Tr_{12}$, and $Tr_{13}$ and $Tr_{14}$ respectively.

Differential amplifiers $Q_3$ and $Q_4$ form a first signal composite circuit, and $Q_5$ and $Q_6$ a second signal composite circuit. The purpose of differential amplifiers $Q_1$ and $Q_2$ is to form in-phase and negative phase output signals with respect to the respective input signals. The first signal composite circuit having differential amplifiers $Q_3$ and $Q_4$ and the second signal composite circuit having differential amplifiers $Q_5$ and $Q_6$ are operated for combining said two individual input signals vector-wise. The distribution ratios of the magnitudes of the input signals are controlled by an external control voltage.

More specifically, the base terminal of the transistor $Tr_1$ is connected to the input terminal 10, and the transistors $Tr_1$ and $Tr_2$ have their collectors connected in common to the power source terminal 15. The emitter terminal of the transistor $Tr_1$ is connected to the base terminal of the transistor $Tr_3$ and through the phase lead circuit (PLC) to the base terminal of the transistor $Tr_2$ . The output terminal 11 is connected between the emitter terminal of $Tr_1$ and the load resistor $R_1$ , and the B-Y subcarrier is delivered from this output terminal. The other end of the load resistor $R_1$ is grounded. Since the transistor $Tr_1$ and the load resistor $R_1$ form an emitter follower, its output impedance is low. The emitter terminal of $Tr_2$ is connected to the base terminal of $Tr_6$ and is grounded via the load resistor $R_2$ . The transistors $Tr_{13}$ and $Tr_{14}$ have their emitters connected in common to the collector of $Tr_6$ . The transistors $Tr_{11}$ and $Tr_{12}$ have their emitters connected to the collector of $Tr_4$ . The base terminals of $Tr_{11}$ and $Tr_{14}$ are connected directly to each other, as are the base terminals of $Tr_{12}$ and $Tr_{13}$. The distribution ratio of the input signals supplied to the common emitter terminals is controlled by controlling the difference $DV_4$ between voltages at the points where the bases of transistors $Tr_{11}$ and $Tr_{14}$, and $Tr_{12}$ and $Tr_{13}$ are connected directly to each other. The collector terminals of $Tr_{12}$ and $Tr_{14}$ are connected directly to each other, as are the collectors of $T_{11}$ and $Tr_{13}$. The connection points of these collectors are connected to each other via the load resistor $R_G$. The output terminal 13, for delivering the G-Y subcarrier, is connected between one end of the load resistor $R_G$ and the collector terminal of $Tr_{11}$. The other end of the load resistor $R_G$ is connected to the power source whereby a voltage $V_2$ is applied to this resistor $R_G$.

The base terminals of $Tr_4$ and $Tr_5$ are connected directly to each other, and a bias voltage $V_1$ is applied to the connection point of these bases via the power source terminal 14. This voltage $V_1$ is made equal to the potentials of the lines 101 and 102. The transistors $Tr_9$ and $Tr_{10}$ have their emitters connected in common to the collector of $Tr_5$. The transistors $Tr_1$ and $Tr_8$ have their emitters connected in common to the collector of $Tr_3$. The transistors $Tr_7$ through $Tr_{10}$ are connected in the circuit in the same manner as the transistors $Tr_{11}$ through $Tr_{14}$. The output terminal 12 for delivering the R-Y subcarrier is connected between one end of the load resistor $R_R$ and the collector terminal of $Tr_7$.

When a subcarrier $\dot{a}_o$ is supplied to the base of $Tr_1$ from the input terminal 10, a signal in-phase with the input subcarrier wave $\dot{a}_0$ is produced at the emitter terminal of $Tr_1$ and delivered to the output terminal 11. At the same time, this emitter output is applied to the base of $Tr_2$ by way of the phase lead circuit (PLC) whereby a signal $\dot{b}_0$ with a leading phase of $\theta°$ ahead the signal $\dot{a}_0$ is formed at the emitter of $Tr_2$. The signals $\dot{a}_0$ and $\dot{b}_0$ are supplied to the differential amplifiers $Q_1$ and $Q_2$ via lines 101 and 102 respectively whereby signals $\dot{a}_1$, $\dot{a}_0$, $\dot{b}_0$ and $\dot{b}_1$ are formed at the collector terminals of transistors $Tr_3$ through $Tr_6$ respectively. These signals are supplied to the differential amplifiers $Q_3$, $Q_5$, $Q_4$ and $Q_6$ via the lines 103 through 106 respectively. The signals $a_1$ and $b_0$ are combined vector-wise in the differential amplifiers $Q_3$ and $Q_4$, and the composite vector signal is delivered to the output terminal 12. The signals $\dot{a}_0$ and $\dot{b}_1$ are combined vector-wise in the differential amplifiers $Q_5$ and $Q_6$ and the composite vector signal is produced across the collector load resistor $R_G$ and derived from the output terminal 13.

The distribution ratio (vector value distribution ratio) between the signal $a_1$ supplied to the differential amplifier $Q_3$ and the signal $\dot{b}_0$ supplied to the differential amplifier $Q_4$ is controlled by the base voltage difference $\Delta V_3$. Hence, by setting the base voltage difference $\Delta V_3$ at a specific value, a desired vector distribution composite ( $\dot{a}_3$ , $\dot{b}_0$ ) is realized and thus an R-Y subcarrier can be obtained from the output terminal 12. The signal $\dot{a}_0$ supplied to the differential amplifier $Q_5$ and the signal $\dot{b}_1$ supplied to the differential amplifier $Q_6$ are combined ( $\dot{a}_2$ , $\dot{b}_1$ ) in the same manner as above, and a G-Y subcarrier (vector composite signal) is obtained from the output terminal 13.

A capacity of about 10pF will suffice for the capacitor C used in the phase lead circuit. In other words, a silicon oxide film capacity or PN junction capacity can be used for the purpose of said capacitor C. This makes it possible to realize the phase lead circuit in the form of integrated circuit. This means that the conventional subcarrier phase shift circuit using L, C and R elements can be replaced with an integrated circuit according to this invention.

In the foregoing embodiment, three-axis demodulation method is used. Instead, it is apparent that two-axis demodulation method may be used. In the embodiment, a $\theta°$ phase lead circuit is used. Instead, a phase lag circuit may be used according to the principle of this invention.

We claim:

1. A color subcarrier phase shift circuit comprising:
a. a positive phase shift circuit which receives a first color subcarrier signal $\dot{a}_o$ and operatingly shifts said first subcarrier signal $\dot{a}_o$ by a specific angle $\theta$ in phase, to produce a signal $\dot{b}_o$, said positive phase shift circuit comprising a capacitor and a resistor connected together in series, said first color subcarrier signal being applied across the series circuit of said capacitor and said resistor and said signal $\dot{b}_o$ being derived across said resistor;
b. a phase inversion circuit which receives said first color subcarrier signal $\dot{a}_o$ and said signal $\dot{b}_o$ and operatingly inverts said signals $\dot{a}_o$ and $\dot{b}_o$ to produce inverted signals $\dot{a}_1$ and $\dot{b}_1$ having phases inverted with respect to those of said signals $\dot{a}_o$ and $\dot{b}_o$, respectively;
c. a first signal composite circuit applied with a first controlled signal and receiving said signals $\dot{b}_o$ and $\dot{a}_1$, said first control signal applied to said first composite circuit controlling the input distribution ratio of the magnitudes of said input signals $\dot{b}_o$ and $\dot{a}_1$, said first signal composite circuit operatingly combining vector-wise said input signals $\dot{a}_1$ and $\dot{b}_o$ thus controlled in their magnitudes; and
d. a second signal composite circuit applied with a second control signal and receiving said signal $\dot{b}_1$ and one of said signals $\dot{a}_o$ and $\dot{a}_1$, said second control signal applied to said second signal composite circuit controlling the input distribution ratio of the magnitudes of said input signal $\dot{b}_1$ and one of said signals $\dot{a}_o$ and $\dot{a}_1$, said second signal composite circuit operatingly combining vector-wise said input signals $\dot{b}_1$ and one of said signals $\dot{a}_o$ and $\dot{a}_1$ thus controlled in their magnitudes;

whereby second and third color subcarriers each having a specific phase relation with respect to the first color subcarrier are produced.

2. A color subcarrier phase shift circuit comprising:
a. an emitter follower circuit supplied with a first color subcarrier signal $\dot{a}_o$ and provided, at the emitter thereof, with an output terminal from which the color subcarrier signal $\dot{a}_o$ is delivered at a low output impedance;
b. a positive phase phase shift circuit connected to the output terminal of said emitter follower circuit for shifting the phase of said color subcarrier signal $\dot{a}_o$ supplied from the output terminal by a specific angle $\theta$ to thereby produce a signal $\dot{b}_o$, said positive phase shift circuit comprising a capacitor and a resistor connected together in series, the capacitor having an input terminal for receiving said first color subcarrier signal $\dot{a}_o$ and an output terminal connected to a node between said capacitor and said resistor for producing said signal $\dot{b}_o$, the other end of the resistor being connected to ground;
c. a pair of differential amplifiers, one input terminal of one of the pair of differential amplifiers being connected to said positive phase shift circuit and one input terminal of the other of the pair of differential amplifiers being connected with the output terminal of said emitter follower circuit, the remaining input terminals of the pair of differential amplifiers being connected together and supplied thereto with a reference voltage, whereby said signals $\dot{b}_o$ and $\dot{a}_o$ are inverted to obtain signals $\dot{b}_1$ and $\dot{a}_1$, respectively;

d. a first signal composite circuit which receives said signals $\dot{b}_o$ and $\dot{a}_1$ to combine vector-wise said signal $\dot{b}_o$ with said signal $\dot{a}_1$ and a voltage for controlling the input distribution ratio of the magnitudes of said signals supplied to the first signal composite circuit; and e. a second signal composite circuit which receives said signal $\dot{b}_1$ and one of said signals $\dot{a}_o$ and $\dot{a}_1$ to combine vector-wise said signal $\dot{b}_1$ with one of said signals $\dot{a}_o$ and $\dot{a}_1$ and a voltage for controlling the input distribution ratio of the magnitudes of said signals supplied to the second signal composite circuit;

whereby second and third color subcarriers, each having a specific phase relation with respect to the first color subcarrier, are produced.

3. A color subcarrier phase shift circuit supplied with a first color subcarrier signal $\dot{a}_o$ whose phase is coincident with that of a B-Y subcarrier comprising:

a. a first phase shift circuit supplied with the first color subcarrier signal $\dot{a}_o$ for positively shifting the phase of said input subcarrier signal $\dot{a}_o$ by a specific phase lead angle $\theta$ less than 90° to thereby produce a shifted signal $\dot{b}_o$, b. a second phase shift circuit supplied with the signals $\dot{a}_o$ and $\dot{b}_o$ for inverting the phases of said signals supplied thereto, to thereby produce signals $\dot{a}_1$ and $\dot{b}_1$ inverted with respect to the signals $\dot{a}_o$ and $\dot{b}_o$, respectively;

c. first and second signal composite circuits each supplied with two signals for operatingly combining vector-wise the two signals supplied thereto together, said first signal composite circuit being supplied with said signals $\dot{a}_1$ and $\dot{b}_o$ and said second signal composite circuit being supplied with said signal $\dot{b}_1$ and one of said signals $\dot{a}_o$ and $\dot{a}_1$, respectively; and d. control means for supplying first and second control signals to said first and second signal composite circuits so as to control the input distribution ratio of the magnitudes of the two signals supplied to each said signal composite circuits, respectively, whereby a second color subcarrier signal which has a leading phase angle of about 90° coincident with the phase of an R-Y subcarrier and a third color subcarrier signal which has a lagging phase angle of about 123° coincident with the phase of a G-Y subcarrier are obtained from said first and second signal composite circuits, respectively.

4. A color subcarrier phase shift circuit in accordance with claim 3 in which each of said signal composite circuits comprises two differential amplifiers, and said control means supplies to the respective differential amplifiers said first and second control voltages, respectively for controlling said input signal magnitude distrubution ratio.

5. A color subcarrier phase shift circuit in accordance with claim 3 in which the first phase shift circuit comprises a capacitor and a resistor connected in series together, said phase shift circuit having a pair of output terminals provided at the both ends of said resistor for producing the shifted signal $\dot{b}_o$ and a pair of input terminals provided at both ends of said series circuit for receiving said input subcarrier signal $\dot{a}_o$.

6. A color subcarrier phase shift circuit according to claim 3, wherein said second signal composite circuit is supplied with said signals $\dot{b}_1$ and $\dot{a}_1$ when the phase lead angle $\theta$ is within 57° to 90°.

7. A color subcarrier phase shift circuit according to claim 3, wherein said second signal composite circuit is supplied with said signals $\dot{b}_1$ and $\dot{a}_o$ when the phase lead angle $\theta$ is less than or equal to 57°.

8. A color subcarrier phase shift circuit according to claim 3, wherein the input signal magnitude distribution ratio of said first signal composite circuit is controlled by said first control signal in such a manner that the magnitude of said signal $\dot{a}_1$ is changed to a certain value, which when combined vector-wise with said signal $\dot{b}_o$, produces a first composite signal output having a leading phase angle of about 90° with respect to said signal $\dot{a}_o$, and wherein the input signal magnitude distribution ratio of said second signal composite circuit is controlled by said second control signal in such a manner that the magnitude of one of said signals $\dot{a}_o$ and $\dot{a}_1$ changes to a certain value which, when combined vector-wise with said signal $\dot{b}_1$ produces a second composite signal output having a lagging phase angle of about 123° with respect to said signal $\dot{a}_o$.

9. A color subcarrier phase shift circuit comprising:

a. first means which receives a first color subcarrier signal and operatingly shifts said first subcarrier signal by a specific phase angle $\theta$ to produce a second color subcarrier signal, said first means including a positive phase shift circuit comprising a capacitor and a resistor connected together in series, said first color subcarrier signal being applied across the series circuit of said capacitor and said resistor and said second color subcarrier signal being derived across said resistor;

b. second means, which comprises first and second differential amplifier circuits for receiving said first and second color subcarrier signals at first and second input terminals thereof and for receiving a first control voltage at third and fourth input terminals thereof, for supplying said first and second color subcarrier signals at first and second output terminals thereof, while also producing third and fourth color subcarrier signals at third and fourth output terminals thereof, the phases of which are inverted with respect to said first and second color subcarrier signals, respectively; and c. third means, responsive to said first, second, third and fourth color subcarrier signals, for combining said second and third color subcarrier signals with respect to each other and for combining said fourth color subcarrier signal with one of said first and third color subcarrier signals and for producing fifth and sixth color subcarrier signals while receiving voltages for controlling the combining of said subcarrier signals;

whereby each of said fifth and sixth color subcarrier signals has a specific phase relationship with respect to said first color subcarrier signal.

10. A circuit according to claim 9, wherein said third means comprises a first signal composite circuit and a second signal composite circuit, each having first and second differential amplifiers, the first and second differential amplifiers of said first composite circuit being connected to the first and fourth output terminals from said first and second differential amplifiers of said second means, and said first and second differential amplifiers of said second composite circuit being connected to the second and third output terminals of said first and second differential amplifiers of said second means, and wherein the output terminals of each of said first and second differential amplifiers of said first and second composite circuits are connected respectively in parallel across first and second load impedances to produce said fifth and sixth color subcarrier signals respectively.

11. A circuit according to claim 10 wherein each of said first and second differential amplifiers of said first and second composite circuits have first and second control terminals thereof connected in parallel and supplied with first and second control voltages from said fourth means.

12. A circuit according to claim 11, wherein said first and second differential amplifiers of said second means comprise transistor circuits, the emitters of which are respectively connected together through respective impedance elements to a first source of reference potential and the bases of which are connected to said first means and said first control voltage, respectively.

13. A circuit according to claim 12, wherein the first and second differential amplifiers of said first composite circuit have their emitters connected together and to the collectors of a first of the transistors of said first and second differential amplifiers of said second means, while the first and second differential amplifiers of said second composite circuit have their emitters connected together and to the collectors of a second transistor of said first and second differential amplifiers of said second means.

14. A circuit according to claim 13, wherein the bases of respective first and second transistors of each of said first and second differential amplifiers of said first and second composite circuits are connected together to form first and second control input terminals, for receiving said first and second control voltages from said fourth means, respectively.

15. A circuit according to claim 14, wherein the collector electrodes of the first and second transistors of each differential amplifier of each composite circuit are respectively connected together and wherein said first and second load impedances are connected between said connections of said first and second transistor collectors, said fifth and sixth output signals being supplied from the collectors of the respective second transistors of a differential amplifiers of said composite circuits and a second reference potential being supplied to the collectors of said first transistors of said differential amplifiers of said composite circuits.

16. A circuit according to claim 15, wherein each of said first and second transistors of said first means are connected in emitter-follower configuration.

* * * * *